United States Patent
Liang et al.

(10) Patent No.: US 12,494,929 B1
(45) Date of Patent: Dec. 9, 2025

(54) SYSTEMS AND METHODS FOR PROVIDING CHAT INTERFACES TO CONVERSATIONS

(71) Applicant: Otter.ai, Inc., Mountain View, CA (US)

(72) Inventors: Sam S. Liang, Palo Alto, CA (US); Yun Fu, Cupertino, CA (US); Richard B. Tasker, Sunnyvale, CA (US); Xiaoye Liu, San Jose, CA (US); Huajun Zeng, Mountain View, CA (US); Tao Xing, San Jose, CA (US); Neal Granger, Victoria (CA); Cheng Yuan, San Jose, CA (US)

(73) Assignee: Otter.ai, Inc., Mountain View, CA (US)

( * ) Notice: Subject to any disclaimer, the term of this patent is extended or adjusted under 35 U.S.C. 154(b) by 0 days.

(21) Appl. No.: 18/744,259

(22) Filed: Jun. 14, 2024

Related U.S. Application Data (60) Provisional application No. 63/521,672, filed on Jun. 17, 2023.

(51) Int. Cl.
  *G06F 15/16* (2006.01)
  *H04L 12/18* (2006.01)

(52) U.S. Cl.
  CPC .............................. *H04L 12/1813* (2013.01)

(58) Field of Classification Search
  CPC .................................................. H04L 12/1813
  USPC ......................................................... 709/206
  See application file for complete search history.

(56) References Cited

U.S. PATENT DOCUMENTS

| | | |
|---|---|---|
| 6,088,669 A | 7/2000 | Maes |
| 6,363,352 B1 | 3/2002 | Dailey et al. |
| 6,434,520 B1 | 8/2002 | Kanevsky et al. |
| 6,513,003 B1 | 1/2003 | Angell et al. |
| 8,407,049 B2 | 3/2013 | Cromack et al. |
| 8,612,211 B1 | 12/2013 | Shires et al. |
| 8,645,138 B1 | 2/2014 | Weinstein |

(Continued)

FOREIGN PATENT DOCUMENTS

| | | |
|---|---|---|
| CN | 111164676 | 5/2020 |
| JP | 3376487 | 5/2001 |

(Continued)

OTHER PUBLICATIONS

Basu et al., "An Overview of Speaker Diarization: Approaches, Resources and Challenges," 2016 Conference of The Oriental Chapter of International Committee for Coordination and Standardization of Speechx Databases and Assessment Technique (O-COCOSDA), Bali, Indonesia, Oct. 26-28, 2016.

(Continued)

*Primary Examiner* — Imad Hussain
(74) *Attorney, Agent, or Firm* — Faegre Drinker Biddle & Reath LLP (57) ABSTRACT

Method, system, device, and non-transitory computer-readable medium for providing a chat interface. In some embodiments, the method includes: receiving a message associated with a meeting from the chat interface; receiving meeting content associated with the meeting; determining one or more meeting contexts in the meeting content based at least in part on the message; generating a message response using a computational model based at least in part on the one or more meeting contexts and the message; and presenting the message response on the chat interface.

20 Claims, 4 Drawing Sheets

(56) References Cited

U.S. PATENT DOCUMENTS

| | | |
|---|---|---|
| 8,818,803 B2 | 8/2014 | Weber |
| 9,311,932 B2 | 4/2016 | Carter |
| 9,443,518 B1 | 9/2016 | Gauci |
| 9,571,652 B1 | 2/2017 | Zeppenfeld et al. |
| 10,339,918 B2 | 7/2019 | Hofer et al. |
| 10,388,272 B1 | 8/2019 | Thomson et al. |
| 10,573,312 B1 | 2/2020 | Thomson et al. |
| 10,616,278 B1 | 4/2020 | Johansson et al. |
| 10,630,733 B2 | 4/2020 | Modai et al. |
| 10,978,073 B1 | 4/2021 | Fu et al. |
| 11,012,575 B1 | 5/2021 | Leblang et al. |
| 11,017,778 B1 | 5/2021 | Thomson et al. |
| 11,024,316 B1 | 6/2021 | Fu et al. |
| 11,100,943 B1 | 8/2021 | Fu et al. |
| 11,222,185 B2 | 1/2022 | Waibel et al. |
| 11,330,229 B1 | 5/2022 | Crumley et al. |
| 11,330,299 B2 | 5/2022 | Huo |
| 11,423,911 B1 | 8/2022 | Fu et al. |
| 11,431,517 B1 | 8/2022 | Lau et al. |
| 11,657,822 B2 | 5/2023 | Fu et al. |
| 11,676,623 B1 | 6/2023 | Younes et al. |
| 11,869,508 B2 | 1/2024 | Fu et al. |
| 12,020,722 B2 | 6/2024 | Fu et al. |
| 12,080,299 B2 | 9/2024 | Lau et al. |
| 12,182,502 B1 | 12/2024 | Nakajima et al. |
| 2002/0099552 A1 | 7/2002 | Rubin et al. |
| 2004/0107256 A1 | 6/2004 | Odenwald et al. |
| 2004/0117446 A1 | 6/2004 | Swanson |
| 2005/0034079 A1 | 2/2005 | Gunasekar et al. |
| 2005/0152523 A1 | 7/2005 | Fellenstein et al. |
| 2006/0149558 A1 | 7/2006 | Kahn et al. |
| 2006/0182249 A1 | 8/2006 | Archambault et al. |
| 2007/0071206 A1 | 3/2007 | Gainsboro et al. |
| 2007/0106724 A1 | 5/2007 | Gorti et al. |
| 2007/0118374 A1 | 5/2007 | Wise et al. |
| 2007/0183458 A1 | 8/2007 | Bouazizi et al. |
| 2008/0181417 A1 | 7/2008 | Pereg et al. |
| 2008/0293443 A1 | 11/2008 | Pettinato |
| 2008/0294434 A1 | 11/2008 | Pettinato |
| 2008/0300872 A1 | 12/2008 | Basu et al. |
| 2009/0019367 A1 | 1/2009 | Cavagnari et al. |
| 2009/0030680 A1 | 1/2009 | Mamou |
| 2009/0210391 A1 | 8/2009 | Hall et al. |
| 2009/0240488 A1 | 9/2009 | White et al. |
| 2009/0306981 A1 | 12/2009 | Cromack et al. |
| 2009/0307189 A1 | 12/2009 | Bobbitt et al. |
| 2010/0146438 A1 | 6/2010 | Bush et al. |
| 2011/0228922 A1 | 9/2011 | Dhara et al. |
| 2011/0307241 A1 | 12/2011 | Waibel et al. |
| 2011/0320197 A1 | 12/2011 | Conejero et al. |
| 2012/0046936 A1 | 2/2012 | Kandekar et al. |
| 2012/0253805 A1 | 10/2012 | Rajakumar et al. |
| 2012/0275761 A1 | 11/2012 | Li et al. |
| 2012/0281921 A1 | 11/2012 | Dowell |
| 2012/0310644 A1 | 12/2012 | Zimmerman et al. |
| 2012/0323575 A1 | 12/2012 | Gibbon et al. |
| 2012/0324355 A1 | 12/2012 | Mbenkum et al. |
| 2013/0144603 A1 | 6/2013 | Lord et al. |
| 2013/0300939 A1 | 11/2013 | Chou et al. |
| 2013/0311177 A1 | 11/2013 | Bastide et al. |
| 2013/0346077 A1 | 12/2013 | Mengibar et al. |
| 2014/0029757 A1 | 1/2014 | Aronowitz et al. |
| 2014/0134576 A1 | 5/2014 | Edge |
| 2014/0136999 A1 | 5/2014 | Leibovich et al. |
| 2014/0207449 A1 | 7/2014 | Johnson |
| 2015/0012844 A1 | 1/2015 | Paulik et al. |
| 2015/0206544 A1 | 7/2015 | Carter |
| 2015/0249747 A1 | 9/2015 | Box et al. |
| 2015/0255068 A1 | 9/2015 | Kim et al. |
| 2015/0310863 A1* | 10/2015 | Chen ............... G10L 15/26 704/235 |
| 2016/0004732 A1 | 1/2016 | Hsu et al. |
| 2016/0014222 A1 | 1/2016 | Chen et al. |
| 2016/0284354 A1 | 9/2016 | Chen et al. |
| 2016/0322049 A1 | 11/2016 | Bakshi et al. |
| 2017/0068423 A1 | 3/2017 | Napolitano |
| 2017/0068670 A1 | 3/2017 | Orr |
| 2017/0070706 A1 | 3/2017 | Ursin et al. |
| 2017/0169816 A1 | 6/2017 | Blandin et al. |
| 2017/0180780 A1 | 6/2017 | Jeffries |
| 2017/0199934 A1 | 7/2017 | Nongpiur |
| 2017/0294184 A1 | 10/2017 | Bradley |
| 2017/0301037 A1 | 10/2017 | Baughman et al. |
| 2017/0329943 A1 | 11/2017 | Choi et al. |
| 2017/0372693 A1 | 12/2017 | Rangarajan Sridhar et al. |
| 2018/0007060 A1 | 1/2018 | Leblang et al. |
| 2018/0012598 A1 | 1/2018 | Thirukovalluru et al. |
| 2018/0032226 A1 | 2/2018 | Ryu et al. |
| 2018/0061083 A1 | 3/2018 | Suzuki et al. |
| 2018/0143956 A1 | 5/2018 | Skarbovsky et al. |
| 2018/0174108 A1 | 6/2018 | Kang et al. |
| 2018/0197548 A1 | 7/2018 | Palakodety et al. |
| 2018/0315428 A1 | 11/2018 | Johnson et al. |
| 2018/0316893 A1 | 11/2018 | Rosenberg et al. |
| 2019/0073640 A1 | 3/2019 | Odezue et al. |
| 2019/0273767 A1 | 9/2019 | Nelson et al. |
| 2019/0341050 A1 | 11/2019 | Diamant et al. |
| 2019/0364009 A1 | 11/2019 | Joseph et al. |
| 2020/0051582 A1 | 2/2020 | Gilson |
| 2020/0145616 A1 | 5/2020 | Nassar |
| 2020/0175961 A1 | 6/2020 | Thomson et al. |
| 2020/0228358 A1 | 7/2020 | Rampton |
| 2020/0243095 A1 | 7/2020 | Adlersberg et al. |
| 2020/0257587 A1 | 8/2020 | Chau et al. |
| 2020/0311122 A1 | 10/2020 | Ramamurthy |
| 2020/0365160 A1 | 11/2020 | Nassar et al. |
| 2020/0403818 A1 | 12/2020 | Daredia et al. |
| 2020/0412564 A1 | 12/2020 | Roedel et al. |
| 2021/0021558 A1 | 1/2021 | Mahmoud et al. |
| 2021/0044645 A1 | 2/2021 | Jayaweera |
| 2021/0058263 A1 | 2/2021 | Fahrendorff et al. |
| 2021/0058517 A1 | 2/2021 | Serbajlo et al. |
| 2021/0092168 A1 | 3/2021 | Ranalli et al. |
| 2021/0150211 A1* | 5/2021 | Ahmad Hambaly ... G10L 25/93 |
| 2021/0217420 A1 | 7/2021 | Fu et al. |
| 2021/0319797 A1 | 10/2021 | Fu et al. |
| 2021/0327454 A1 | 10/2021 | Fu et al. |
| 2021/0367802 A1 | 11/2021 | Yarlagadda |
| 2021/0369042 A1 | 12/2021 | Gustman et al. |
| 2021/0374391 A1* | 12/2021 | Jorasch ............... G06V 40/19 |
| 2021/0390144 A1* | 12/2021 | B M S ............... H04L 65/4053 |
| 2021/0407520 A1 | 12/2021 | Neckermann et al. |
| 2021/0409547 A1 | 12/2021 | Channapragada et al. |
| 2022/0122436 A1 | 4/2022 | Volkerink et al. |
| 2022/0343918 A1 | 10/2022 | Fu et al. |
| 2022/0353102 A1 | 11/2022 | Lau et al. |
| 2022/0385758 A1 | 12/2022 | Tadesse et al. |
| 2022/0398544 A1 | 12/2022 | Chung et al. |
| 2022/0414130 A1* | 12/2022 | Master Ben-Dor ... G06F 16/316 |
| 2023/0245660 A1 | 8/2023 | Fu et al. |
| 2023/0267948 A1 | 8/2023 | Younes et al. |
| 2023/0297765 A1 | 9/2023 | Vendrow |
| 2023/0325611 A1 | 10/2023 | Garg et al. |
| 2024/0037145 A1 | 2/2024 | Ziccardi et al. |
| 2024/0087574 A1 | 3/2024 | Fu et al. |
| 2024/0095440 A1 | 3/2024 | Rony et al. |
| 2024/0127804 A1 | 4/2024 | Shirodkar et al. |
| 2024/0170006 A1 | 5/2024 | Fu et al. |
| 2024/0205037 A1* | 6/2024 | Callegari ............ H04L 12/1822 |
| 2024/0338860 A1* | 10/2024 | Trzyna ............... G06F 40/44 |
| 2024/0340193 A1* | 10/2024 | Zhu ............... G06F 40/30 |
| 2024/0354493 A1 | 10/2024 | Nakajima et al. |
| 2024/0395254 A1 | 11/2024 | Fu et al. |
| 2024/0428800 A1 | 12/2024 | Lau et al. |
| 2025/0117128 A1 | 4/2025 | Omoigui |
| 2025/0140277 A1 | 5/2025 | Younes et al. |

FOREIGN PATENT DOCUMENTS

| | | |
|---|---|---|
| JP | 2018190431 | 11/2018 |
| JP | 6542983 | 7/2019 |

OTHER PUBLICATIONS (56) References Cited

OTHER PUBLICATIONS

Tur et al., "The CALO Meeting Assistant System," *IEEE Transactions on Audio, Speech, and Language Processing*, vol. 18, No. 6, pp. 1601-1611, Aug. 2010.
United States Patent and Trademark Office, Office Action mailed Dec. 7, 2022, in U.S. Appl. No. 17/863,837.
United States Patent and Trademark Office, Office Action mailed Jul. 5, 2023, in U.S. Appl. No. 17/863,837.
United States Patent and Trademark Office, Office Action mailed Oct. 17, 2023, in U.S. Appl. No. 17/863,837.
United States Patent and Trademark Office, Office Action mailed Jun. 5, 2024, in U.S. Appl. No. 17/863,837.
United States Patent and Trademark Office, Office Action mailed Sep. 9, 2024, in U.S. Appl. No. 17/863,837.
United States Patent and Trademark Office, Office Action mailed Jun. 8, 2023, in U.S. Appl. No. 18/127,343.
United States Patent and Trademark Office, Office Action mailed Sep. 20, 2023, in U.S. Appl. No. 18/127,343.
United States Patent and Trademark Office, Notice of Allowance mailed Dec. 13, 2023, in U.S. Appl. No. 18/127,343.
United States Patent and Trademark Office, Notice of Allowance mailed Mar. 25, 2024, in U.S. Appl. No. 18/127,343.
United States Patent and Trademark Office, Notice of Allowance mailed Aug. 15, 2024, in U.S. Appl. No. 18/127,343.
United States Patent and Trademark Office, Office Action mailed Nov. 15, 2023, in U.S. Appl. No. 18/131,982.
United States Patent and Trademark Office, Office Action mailed Apr. 4, 2024, in U.S. Appl. No. 18/131,982.
United States Patent and Trademark Office, Office Action mailed Jul. 26, 2024, in U.S. Appl. No. 18/131,982.
United States Patent and Trademark Office, Office Action mailed Mar. 25, 2024, in U.S. Appl. No. 18/140,981.
United States Patent and Trademark Office, Notice of Allowance mailed Aug. 5, 2024, in U.S. Appl. No. 18/140,981.
United States Patent and Trademark Office, Office Action mailed Aug. 15, 2024, in U.S. Appl. No. 18/514,666.
United States Patent and Trademark Office, Office Action mailed Mar. 29, 2024, in U.S. Appl. No. 18/438,145.
United States Patent and Trademark Office, Notice of Allowance mailed Jul. 23, 2024, in U.S. Appl. No. 18/438,145.
United States Patent and Trademark Office, Office Action mailed Sep. 10, 2024, in U.S. Appl. No. 18/673,235.
United States Patent and Trademark Office, Notice of Allowance mailed May 8, 2025, in U.S. Appl. No. 17/863,837.
United States Patent and Trademark Office, Notice of Allowance mailed Jun. 23, 2025, in U.S. Appl. No. 18/131,982.
United States Patent and Trademark Office, Notice of Allowance mailed Apr. 30, 2025, in U.S. Appl. No. 18/140,981.
United States Patent and Trademark Office, Notice of Allowance mailed Apr. 25, 2025, in U.S. Appl. No. 18/514,666.
United States Patent and Trademark Office, Notice of Allowance mailed Jul. 8, 2025, in U.S. Appl. No. 18/673,235.
United States Patent and Trademark Office, Notice of Allowance mailed Jul. 8, 2025, in U.S. Appl. No. 18/737,530.
United States Patent and Trademark Office, Notice of Allowance mailed Mar. 26, 2025, in U.S. Appl. No. 17/863,837.
United States Patent and Trademark Office, Office Action mailed Jan. 22, 2025, in U.S. Appl. No. 18/131,982.
United States Patent and Trademark Office, Notice of Allowance mailed Oct. 10, 2024, in U.S. Appl. No. 18/140,981.
United States Patent and Trademark Office, Office Action mailed Jan. 24, 2025, in U.S. Appl. No. 18/514,666.
United States Patent and Trademark Office, Office Action mailed Oct. 11, 2024, in U.S. Appl. No. 18/438,145.
United States Patent and Trademark Office, Office Action mailed Feb. 6, 2025, in U.S. Appl. No. 18/438,145.
United States Patent and Trademark Office, Office Action mailed Jan. 28, 2025, in U.S. Appl. No. 18/673,235.
United States Patent and Trademark Office, Office Action mailed Jan. 29, 2025, in U.S. Appl. No. 18/737,530.
United States Patent and Trademark Office, Notice of Allowance mailed Aug. 21, 2025, in U.S. Appl. No. 18/438,145.

\* cited by examiner

SYSTEMS AND METHODS FOR PROVIDING CHAT INTERFACES TO CONVERSATIONS

CROSS-REFERENCES TO RELATED APPLICATIONS

This application claims priority to U.S. Provisional Application No. 63/521,672, filed Jun. 17, 2023, which is incorporated by reference herein for all purposes.

FIELD OF THE DISCLOSURE

Some embodiments of the present disclosure are related to providing chatting interfaces and/or generating interactive content for meetings, events, and conversations. More particularly, certain embodiments of the present disclosure provide systems and methods for a virtual participant for providing chatting interfaces and/or generating interactive content. Merely by way of example, the present disclosure includes embodiments of generating summaries via a virtual participant, but it would be recognized that the present disclosure has much broader range of applicability.

BACKGROUND

Conversations and/or meetings, such as human-to-human conversations, include information that is often difficult to comprehensively, efficiently, and accurately extract, using conventional methods and systems. The high volume of information presented in various conversations (e.g., meetings) often can lead to information overload for attendees. Also, sometimes, time constraints and/or overlapping schedules may prevent individuals from joining certain meetings on time and/or attending some meetings at all. Additionally, some individuals may find it challenging to closely follow discussions at certain meetings. Hence it is highly desirable to improve the technique for providing information at various conversations and/or meetings (e.g., interactively).

BRIEF SUMMARY OF THE DISCLOSURE

Some embodiments of the present disclosure are related to providing chatting interfaces and/or generating interactive content for meetings, events, and conversations. More particularly, certain embodiments of the present disclosure provide systems and methods for a virtual participant for providing chatting interfaces and/or generating interactive content. Merely by way of example, the present disclosure includes embodiments of generating summaries via a virtual participant, but it would be recognized that the present disclosure has much broader range of applicability.

According to certain embodiments, a computer-implemented method for providing a chat interface, the method comprising: receiving a message associated with a meeting from the chat interface; receiving meeting content associated with the meeting; determining one or more meeting contexts in the meeting content based at least in part on the message; generating a message response using a computational model based at least in part on the one or more meeting contexts and the message; and presenting the message response on the chat interface.

According to some embodiments, a computing system for providing a chat interface, the computing system comprising: one or more memories including instructions stored thereon; and one or more processors configured to execute the instructions and perform operations comprising: receiving a message associated with a meeting from the chat interface; receiving meeting content associated with the meeting; determining one or more meeting contexts in the meeting content based at least in part on the message; generating a message response using a computational model based at least in part on the one or more meeting contexts and the message; and presenting the message response on the chat interface.

According to certain embodiments, a non-transitory computer-readable medium storing instructions for providing a chat interface, the instructions upon execution by one or more processors of a computing system, cause the computing system to perform one or more operations comprising: receiving a message associated with a meeting from the chat interface; receiving meeting content associated with the meeting; determining one or more meeting contexts in the meeting content based at least in part on the message; generating a message response using a computational model based at least in part on the one or more meeting contexts and the message; and presenting the message response on the chat interface.

Depending upon the embodiment, one or more benefits may be achieved. These benefits, features, and advantages of the present disclosure can be fully appreciated with reference to the detailed description and accompanying drawings that follow.

While the present disclosure is amenable to various modifications and alternative forms, specific embodiments have been shown by way of example in the drawings and are described in detail below. The present disclosure is intended to cover all modifications, equivalents, and alternatives falling within the scope of the present disclosure as defined by the appended claims.

DETAILED DESCRIPTION OF THE DISCLOSURE

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information. Some embodiments of the present disclosure are related to a virtual meeting participant (e.g., a virtual assistant). More particularly, certain embodiments of the present disclosure provide systems and methods for a virtual meeting participant for media services. Merely by way of example, the present disclosure has been applied to using the screen captures (e.g., automatically captured screen captures) via a virtual meeting participant, but it would be recognized that the present disclosure has much broader range of applicability.

According to some embodiments, the present disclosure relates generally to the field of natural language processing, and more specifically, to a chat interface that integrates with a meeting collaboration platform, providing real-time access to meeting content and/or facilitating engagement and/or collaboration among meeting participants.

According to certain embodiments, the usage of artificial intelligence (AI) in businesses and/or personal spaces has grown significantly over recent years. For example, AI has been instrumental in enhancing productivity and/or fostering collaboration in various domains, especially in the context of meetings. As an example, however, existing solutions do not adequately provide a seamless, natural language-based, and interactive interface for users to engage with meeting content, create value from the discussion, and/or efficiently catch up on missed information.

In certain embodiments, the present disclosure discloses a system and method for providing a chat interface to one or more conversations (e.g., meeting content), thereby enabling one or more users to access and/or engage with the meeting content in real time and/or post-conversation (e.g., post-meeting). For example, the present disclosure provides a way for one or more users to ask one or more questions and/or receive one or more responses related to the meeting content, thereby increasing productivity, collaboration, and/or accessibility. As an example, the present disclosure introduces a live AI assistant (e.g., a virtual assistant) that can operate as a meeting participant answering one or more questions and/or enabling collaboration among meeting participants. In some embodiments, a virtual assistant can join a meeting (e.g., with a visual representation of the virtual assistant, as a named participant to the meeting, etc.), record a meeting, transcribe a meeting, generate a meeting summary, provide a chat interface, generate a chat response, and/or provide other functionalities.

In some embodiments, a system and method for providing a chat interface to one or more conversations (e.g., implemented according to at least FIG. 1, FIG. 2 and/or FIG. 3) are configured to perform one or more of the following tasks or all of the following tasks:

1. Asking one or more questions according to certain embodiments:
   a. In some examples, receives and/or interprets one or more user inputs in the form of one or more typed questions and/or one or more voice questions related to the one or more conversations (e.g., the meeting content).
   b. In certain examples, utilizes one or more natural language processing techniques to understand the context of the one or more conversations (e.g., the meeting content).
   c. In some examples, the one or more user inputs include one or more user questions across one or more channels (e.g., web, mobile, Zoom chat, and/or Slack chat).

2. Response generation according to some embodiments:
   a. In certain examples, generates one or more responses based at least in part upon the context of the one or more conversations (e.g., the meeting content), the one or more user inputs (e.g., the one or more user questions), and/or one or more previous interactions.
   b. In some examples, the AI assistant acts as a "real participant" in the one or more conversations, each of which includes one or more sessions. For example, the AI assistant possesses history and/or Q&A capability. As an example, the AI assistant can generate content, contribute knowledge, and/or assist for one or more specific tasks. For example, the AI assistant knows when to speak up and/or when to stay silent.
   c. In certain examples, uses one or more advanced AI algorithms to provide one or more real-time and/or meaningful answers to the one or more user inputs (e.g., the one or more user queries).
   d. In some examples, takes into consideration the specific content being discussed during the one or more conversations (e.g., one or more meetings) to deliver relevant information.
   e. In certain examples, the AI assistant performs one or more tasks at the request of one or more participants (e.g., one or more human participants) of the one or more conversations. For example, the one or more tasks include generating content based at least in part upon the context of the one or more conversations (e.g., the meeting content). As an example, the content generated by the AI assistant includes one or more email drafts, one or more summaries, and/or one or more action item lists.
   f. In some examples, provides one or more response by text, speech (e.g., spoken into a live meeting), and/or visual output (e.g., video, slides, and/or document via Zoom).
   g. In certain examples, the one or more responses contain one or more contextual links to one or more other time in the same conversation and/or to one or more other conversations. For example, the one or more contextual links enrich the one or more responses with the Internet content and/or one or more plugins developed by one or more third parties. As an example, the one or more contextual links enrich the content returned.
   h. In some examples, enable one or more developers to develop one or more plugins to enrich the content returned.

3. Chat interface according to certain embodiments:
   a. In some examples, presents the one or more responses to one or more users in a chat interface in one or more channels (e.g., web, mobile, Slack chat, and/or Zoom chat).
   b. In certain examples, provides a seamless and/or intuitive user experience for accessing and/or engaging with the context of the one or more conversations (e.g., the meeting content).
  c. In some examples, allows one or more users to view and/or interact with the chat interface during and/or after a meeting.
  d. In certain examples, one or more users ask one or more "private" questions, to which only the one or more users see one or more responses.
  e. In some examples, one or more users ask one or more "public" questions, to which all meeting participants see one or more responses.
4. Collaboration according to some embodiments:
  a. In certain examples, enables multiple meeting participants to collaborate on meeting content through the chat interface.
  b. In some examples, enables one or more users (e.g., one or more meeting participants) to engage with the system (e.g., the AI assistant) and/or one or more human meeting participants by using the "@mention" feature.
  c. In certain examples, allows one or more meeting participants to ask one or more follow-up questions and/or reply to one or more other meeting participants.
  d. In some examples, facilitates one or more discussions, idea sharing, and/or decision-making within the meeting context.
  e. In certain examples, enhances productivity and/or engagement by providing a platform for one or more collaborative interactions.
5. Scope according to certain embodiments:
  a. In some examples, the system allows one or more users to ask one or more questions about a single meeting and/or ask one or more questions about multiple meetings. For example, the one or more users inquire about one or more specific topics and/or retrieve information from one or more previous meetings, enabling a comprehensive understanding of the overall context.
  b. In certain examples, one or more users specify the scope of context the one or more users want the system to consider when answering one or more questions. For example, the one or more users request information based on a specific meeting (e.g., a 1:1 meeting, a team meeting, or an all-hands meeting), ensuring that the one or more responses to the one or more questions are tailored to the desired context. As an example, the one or more users request information based on a selection of multiple meetings (e.g., a recurring meeting series and/or a channel of meetings), ensuring that the one or more responses to the one or more questions are tailored to the desired context.
6. Proactive surfacing of one or more answers and/or relevant information according to some embodiments:
  a. In certain examples, the AI assistant proactively identifies one or more relevant answers and/or information related to the ongoing discussion. For example, the AI assistant intelligently analyzes the conversation and/or one or more meeting artifacts to identify one or more pertinent details and then surfaces the identified one or more pertinent details without waiting for a specific question, enhancing efficiency and providing timely insights.
7. Performing one or more actions automatically on behalf of one or more users according to certain embodiments:
  a. In some examples, the system has the capability to perform one or more actions on behalf of one or more users. For example, the one or more users delegate one or more tasks to the AI assistant, thus streamlining workflow and/or reducing manual effort. As an example, one or more tasks include sending one or more emails, scheduling one or more meetings, and/or performing one or more other routine actions.
8. Generating content based on one or more meeting artifacts according to some embodiments:
  a. In certain examples, the AI assistant generates content based at least in part upon one or more meeting artifacts (e.g., one or more presented slides, one or more media, one or more attached documents, and/or one or more other meeting materials). For example, the AI assistant creates one or more summaries, one or more action item lists, and/or one or more other relevant documents. As an example, the AI assistant leverages the content discussed during the meeting to facilitate documentation and/or knowledge sharing.
9. Adjusting one or more responses according to certain embodiments:
  a. In some examples, one or more users have the option to customize the format and/or style of the AI assistant's one or more responses to suit one or more preferences and/or the specific communication context of the one or more users. For example, the one or more users request one or more shorter answers and/or request one or more detailed answers. As an example, the one or more users request formal language and/or informal language. For example, the one or more users request one or more bullet-pointed summaries. As an example, the one or more users request any other one or more adjustments.

Figure 1:
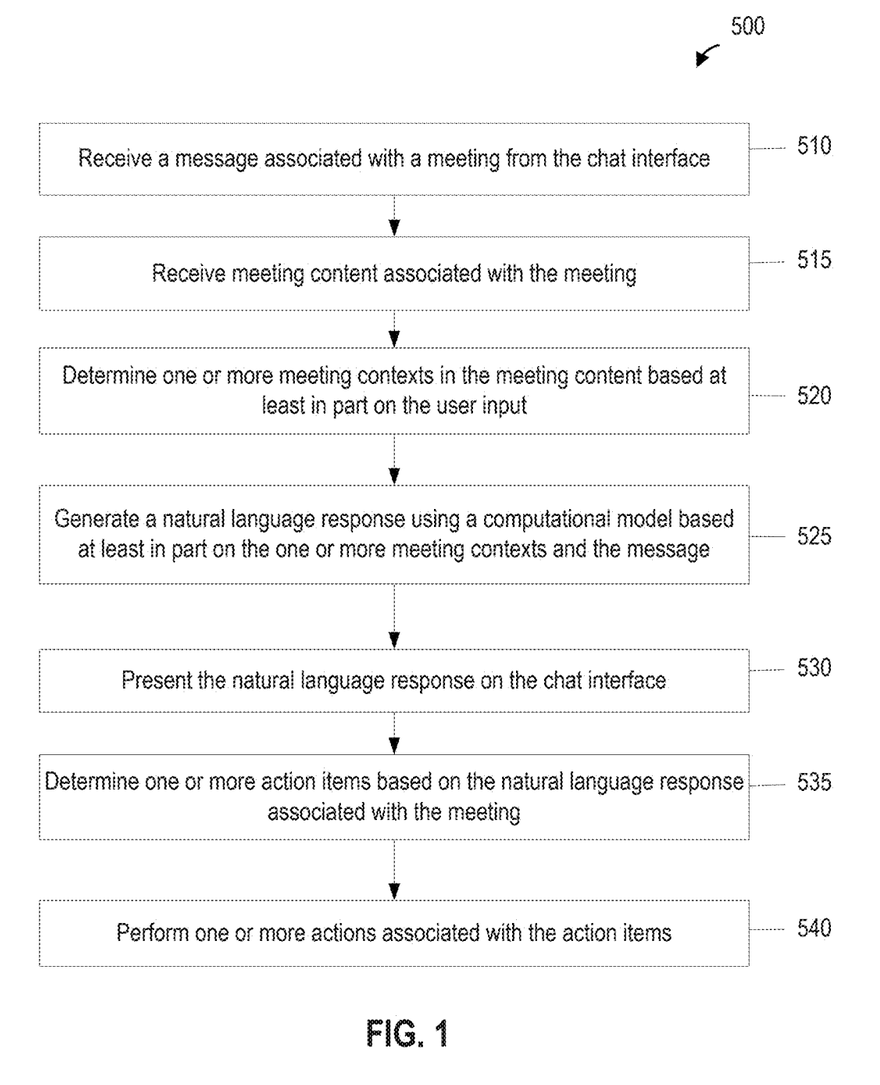
FIG. 1 is a simplified diagram showing a method for providing a chat interface for a meeting (e.g., a conversation, an online meeting, an event, one or more meetings, etc.), according to certain embodiments of the present disclosure.
Figure 2:
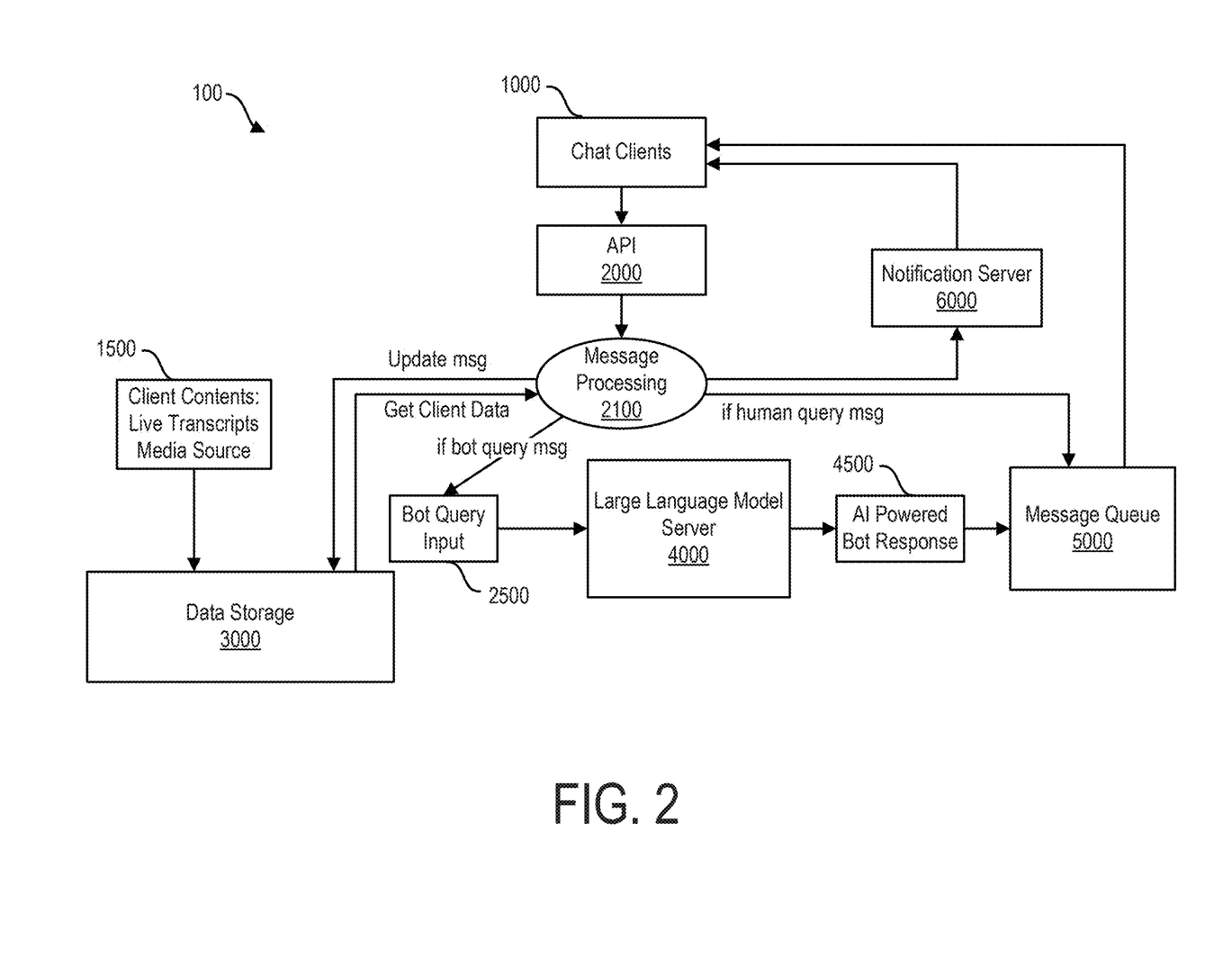
FIG. 2 is a simplified diagram showing a system for providing a chat interface to one or more conversations according to certain embodiments of the present disclosure.
Figure 3:
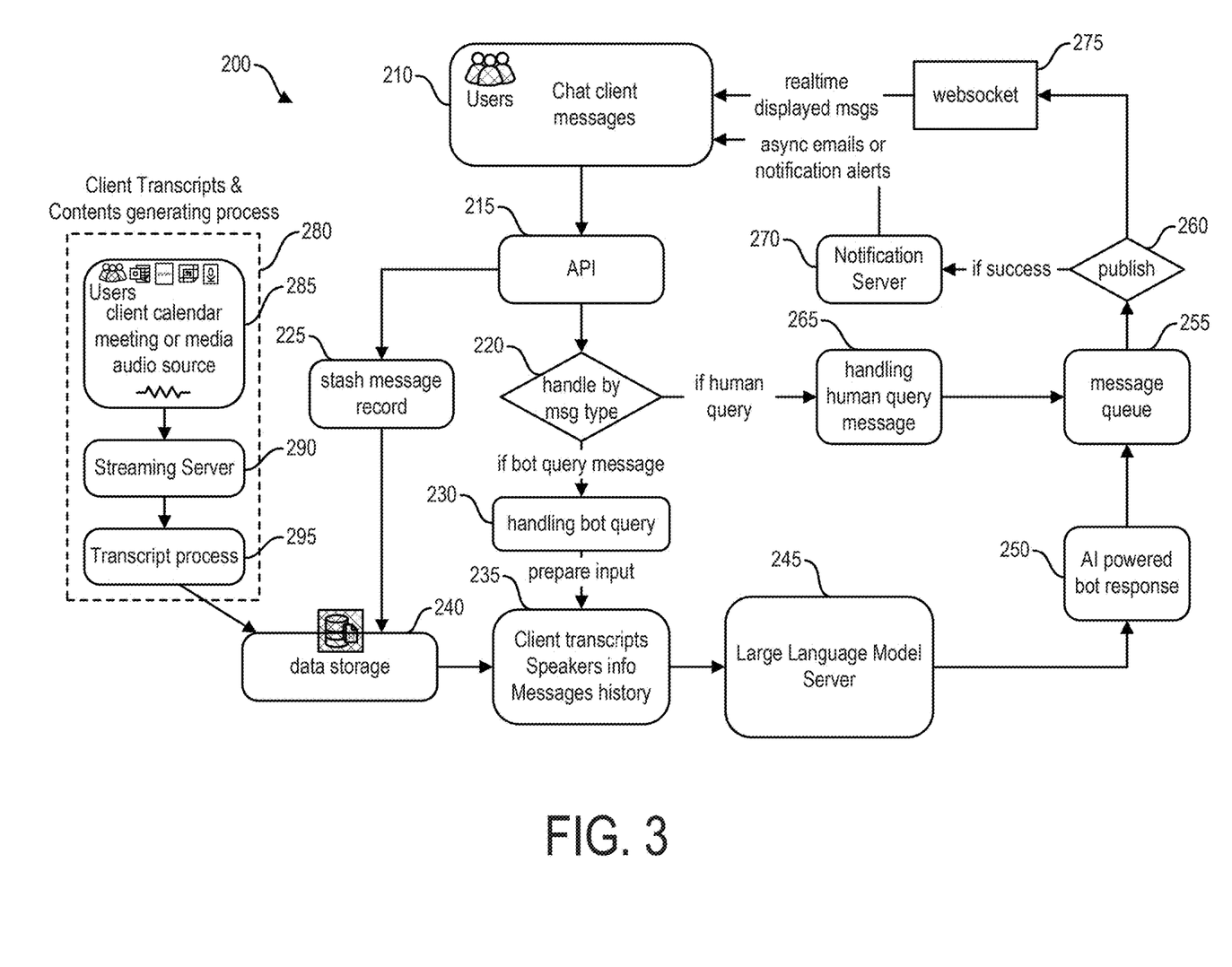
FIG. 3 is a simplified diagram showing a method for providing a chat interface to one or more conversations according to certain embodiments of the present disclosure.

According to certain embodiments, the system and method for providing a chat interface to one or more conversations is implemented according to at least FIG. 1, FIG. 2 and/or FIG. 3 to perform one or more of the above tasks or all of the above tasks. For example, the system for providing a chat interface to one or more conversations is implemented according to at least FIG. 2 to perform one or more of the above tasks or all of the above tasks. As an example, the method for providing a chat interface to one or more conversations is implemented according to at least FIG. 3 to perform one or more of the above tasks or all of the above tasks.

According to some embodiments, the system and method for providing a chat interface to one or more conversations provide a comprehensive and/or efficient chat interface that integrates with a meeting collaboration platform. For example, the system and method for providing a chat interface to one or more conversations provide real-time access to meeting content, foster engagement and/or collaboration among meeting participants, and/or enhances productivity by providing a natural language-based and interactive interface for one or more users to interact with the meeting content. For example, the meeting participants include an AI assistant (e.g., a virtual assistant) and one or more human participants. As an example, the meeting participants include multiple human participants.

According to certain embodiments, the system and method for providing a chat interface uses a computational model to process received chat content and/or generate responses. In certain embodiments, a computational model includes a model to process data. In some embodiments, a computational model includes, for example, an artificial intelligence (AI) model, a machine learning (ML) model, a deep learning (DL) model, an image processing model, an algorithm, a rule, other computational models, and/or a combination thereof. In certain embodiments, the system and method for providing a chat interface uses a machine learning model to process received chat content and/or generate responses.

In some embodiments, the machine learning model is a language model ("LM") that may include an algorithm, rule, model, and/or other programmatic instructions that can predict the probability of a sequence of words. In some embodiments, a language model may, given a starting text string (e.g., one or more words), predict the next word in the sequence. In certain embodiments, a language model may calculate the probability of different word combinations based on the patterns learned during training (based on a set of text data from books, articles, websites, audio files, etc.). In some embodiments, a language model may generate many combinations of one or more next words (and/or sentences) that are coherent and contextually relevant. In certain embodiments, a language model can be an artificial intelligence model that has been trained to understand, generate, and manipulate language. In some embodiments, a language model can be useful for natural language processing, including receiving natural language prompts and providing message responses based on the text on which the model is trained. In certain embodiments, a language model may include an n-gram, exponential, positional, neural network, and/or other type of model.

In certain embodiments, the machine learning model is a large language model (LLM), which was trained on a larger data set and has a larger number of parameters (e.g., millions of parameters). In certain embodiments, an LLM can understand complex textual inputs and generate coherent responses due to its extensive training. In certain embodiments, an LLM can use a transformer model that learns context and tracking relationships, and uses an attention mechanism. In some embodiments, a language model includes an autoregressive language model, such as a Generative Pre-trained Transformer 3 (GPT-3) model, a GPT 3.5-turbo model, a Claude model, a command-xlang model, a bidirectional encoder representations from transformers (BERT) model, a pathways language model (PaLM) 2, and/or the like. Thus, a prompt including the health and state may be provided for processing by the LLM, which thus generates a recommendation accordingly.

FIG. 1 is a simplified diagram showing a method 500 for providing a chat interface for a meeting (e.g., a conversation, an online meeting, an event, one or more meetings, etc.), according to certain embodiments of the present disclosure. This diagram is merely an example. One of ordinary skill in the art would recognize many variations, alternatives, and modifications. The method 500 for generating conversation summaries includes processes 510, 515, 520, 525, 530, 535, and 540. Although the above has been shown using a selected group of processes for the method 500 for generating live summaries, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 500 are performed by a system (e.g., the computing system illustrated in FIG. 2). In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, the method 500 includes a process 510 of receiving a message (e.g., one or more messages) associated with a meeting (e.g., a conversation, an event, an online meeting, an online and in-person meeting, etc.) from a chat interface. In certain embodiments, a chat interface is provided by a client application running on a computing device (e.g., a client device). In some embodiments, the chat interface includes an audio interface and/or a visual interface. In certain embodiments, the message includes a voice message received via the audio interface. In some embodiments, the message includes a plurality of messages. In certain embodiments, the message includes a textual message. In some examples, the message is received while the meeting occurs. In certain examples, the message is received after the meeting occurs. In some examples, the message is submitted by a meeting participant. In certain examples, the message is submitted by a human user who is not a meeting participant. In some examples, the message includes a user input (e.g., a question, a query, etc.).

According to certain embodiments, the method 500 includes a process 515 of receiving and/or obtaining meeting content associated with the meeting. In some embodiments, the meeting content includes audio data recording during the meeting and/or transcripts corresponding to the audio data. In certain embodiments, the meeting content includes one or more audio segments (e.g., recorded during the meeting) and/or one or more transcript segments, for example, while the meeting is on-going. In some embodiments, the meeting content includes meeting participant information and/or speaker information. In certain embodiments, the meeting content includes meeting information including, for example, meeting location, meeting time, and/or the like. In some embodiments, the meeting content includes one or more meeting artifacts. In certain embodiments, the one or more artifacts include one or more presented slides, one or more media, one or more attached documents, one or more video played, one or more other meeting materials, and/or the like. In some embodiments, the meeting content, the messages, transcripts, and/or audio data are stored in a data repository (e.g., the data storage 3000).

In certain embodiments, at least a part of the meeting content is generated by a virtual assistant, also referred to as an AI assistant. In certain embodiments, a virtual assistant is a software (e.g., a software module) or software service running on a computing device. In some embodiments, a virtual assistant can join a meeting (e.g., with a visual representation of the virtual assistant, as a named participant to the meeting, etc.), record a meeting, transcribe a meeting, generate a meeting summary, provide a chat interface, generate a chat response, and/or provide other functionalities.

According to some embodiments, the method 500 includes a process 520 of determining one or more meeting contexts in the meeting content based at least in part on the message. In certain embodiments, the one or more meeting contexts include one or more audio segments, one or more transcript segments, one or more media artifacts, meeting information, speaker information, and participant information. In some embodiments, the system selects the one or more meeting contexts based on the message. In certain embodiments, the one or more meeting contexts include one or more meeting contexts of one or more other meetings (e.g., previous meetings, relevant meetings). In some embodiments, the one or more meeting contexts include all available audio segments and/or transcript segments of the meeting.

According to certain embodiments, the method 500 includes a process 525 of generating a message response using a computational model based at least in part on the one or more meeting contexts and the message. In some embodiments, the system is configured to generate the message response by the virtual assistant. In certain embodiments, the system is configured to generate the message response by the virtual assistant within a threshold time duration (e.g., within 1 second, within 3 seconds, within 10 seconds, within 1 minute, etc.) from receiving the message, for example, conversational. In some embodiments, the virtual assistant generates a prompt based at least in part on the message and the one or more meeting contexts. In certain embodiments, the virtual assistant transmits the prompt to a computing device hosting the computational model (e.g., a language model, a large language model). In some embodiments, the virtual assistant receives, from the computing device, the message response generated based at least in part on the prompt.

In some embodiments, the system generates message response based at least in part on the one or more meeting contexts and the message while the meeting occurs. In certain embodiments, the system receives an input indicating one or more criteria (e.g., desired input, etc.), for example, from the user. In some embodiments, the system generates the message response based at least in part on the one or more meeting contexts, the one or more criteria, and the message.

According to certain embodiments, the virtual assistant is configured to generate one or more prompts based on the one or more meeting contexts without receiving a message. For example, the virtual assistant is configured to generate one or more prompts when a speaker changes during the meeting. In some embodiments, the virtual assistant transmits the one or more prompts to a computing device running a computational model (e.g., a language model, a large language model) and receives one or more insights associated with the meeting generated by the computational model.

According to certain embodiments, the method 500 includes a process 530 of presenting the message response on the chat interface. In some embodiments, the chat interface includes an audio interface, and the system is configured to output the message response as a voice response via the audio interface. In certain embodiments, the virtual assistant is configured to output the message response as a voice response via the audio interface. In some embodiments, the virtual assistant identifies a moment (e.g., a silent moment, a speaker changing moment) during the meeting while the meeting is occurring. In certain embodiments, the virtual assistant outputs the voice response via the audio interface at the moment.

According to some embodiments, the message response includes a text response (e.g., a natural language response). In certain embodiments, the chat interface includes a meeting content section and a chat section visually. In some embodiments, the system presents the text response in the chat section. In certain embodiments, the virtual assistant presents the message response on the chat interface while the meeting occurs. In some embodiments, the system presents the message response on the chat interface includes an indication that the message response is output by the virtual assistant.

According to certain embodiments, the message is received by a subset of meeting participants specified by a user. In some embodiments, the message response is presented to the subset of meeting participants and the user. In certain embodiments, the subset of meeting participants include the user and the virtual assistant. In some embodiments, the message response is presented to the user only. In certain embodiments, the system receives a specific format associated with the user and/or the meeting. In some embodiments, the system revises the message response based on the specific format.

According to some embodiments, the system is configured to receives a second message via the chat interface. In certain embodiments, the second message is addressed to a human participant of the meeting. In some embodiments, the system receives a second response from a human participant of the meeting. In certain embodiments, the system presents the second response via the chat interface.

According to certain embodiments, the method 500 includes a process 535 of determining one or more action items (e.g., sending an email, sending an invitation, etc.) associated with the meeting and/or a user (e.g., the user submitted the message). In some embodiments, the virtual assistant determines one or more action items associated with the meeting and/or the user. In certain embodiments, the method 500 includes a process 540 of performing one or more actions associated with the one or more action items. In some embodiments, the virtual assistant is configured to perform one or more actions associated with the one or more action items.

FIG. 2 is a simplified diagram showing a system for providing a chat interface to one or more conversations according to certain embodiments of the present disclosure. This diagram is merely an example, which should not unduly limit the scope of the claims. One of ordinary skill in the art would recognize many variations, alternatives, and modifications. The system 100 for providing a chat interface to one or more conversations includes an application programming interface (API) 2000, a message processing unit 2100, a data storage unit 3000 (e.g., a data storage, a data repository, etc.), a large language model server 4000, a message queue unit 5000, and a notification server 6000. Although the above has been shown using a selected group of components for the system for providing a chat interface to one or more conversations, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present disclosure.

In some embodiments, one or more chat clients (e.g., one or more users) 1000 send one or more messages (e.g., one or more chat client messages) through the API 2000. For example, the one or more messages are one or more text messages. As an example, the one or more messages are one or more audio messages. In certain examples, the one or more messages are one or more user inputs (e.g., one or more user questions). For example, the one or more messages include one or more questions. As an example, the one or more messages include one or more user queries. In some examples, the API 2000 is configured to handle the one or more messages from the one or more chat clients (e.g., one or more users).

In certain embodiments, the message processing unit 2100 determines whether or not the one or more messages are valid. In some examples, if the one or more messages are determined to be valid, the message processing unit 2100 sends the one or more valid messages to the data storage unit 3000. For example, the data storage unit 3000 stores the one or more valid messages (e.g., stashes one or more message records). In some examples, the data storage unit 3000 stores data associated with client contents 1500 (e.g., live transcripts, media source, meeting content associated with one or more meetings, etc.). In certain examples, the data storage unit 3000 also stores at least one or more transcripts that are generated by at least a transcription and/or content generation process (e.g., a client transcription and content generation process). As an example, the transcription and/or content generation process includes receiving information about client calendar meeting and/or media audio source by a streaming server and generating one or more transcripts based at least in part upon data outputted by the streaming server.

In some embodiments, if the one or more messages are determined to be valid, the message processing unit 2100 determines one or more types of the one or more valid messages. For example, the one or more valid messages are addressed to at least one bot (e.g., an AI assistant) to generate query input 2500, as referred to as query messages. As an example, the one or more valid messages are addressed to one or more humans (e.g., one or more human participants). For example, the one or more valid messages are addressed to at least one bot (e.g., an AI assistant) and also to one or more humans (e.g., one or more human participants).

According to some embodiments, if the one or more valid messages are addressed to one or more humans (e.g., one or more human participants), the message processing unit 2100 sends the one or more valid messages to the message queue unit 5000 and also sends information about the one or more valid messages to the notification server 6000. For example, the one or more valid messages that are addressed to one or more humans (e.g., one or more human participants) are one or more human query messages. In certain examples, the message queue unit 5000 provides one or more chat message updates in real time to all of the one or more chat clients (e.g., one or more users) using the same chat interface (e.g., the same chat window). For example, the message queue unit 5000 publishes, in real time, the one or more valid messages through the chat interface (e.g., in the chat window). As an example, the message queue unit 5000 publishes, in real time, the one or more valid messages by using at least WebSocket. In some examples, the notification server 6000 provides one or more asynchronous notifications (e.g., one or more asynchronous alerts) about the one or more chat message updates. For example, the notification server 6000 provides the one or more asynchronous notifications via email and/or one or more other asynchronous alert systems. As an example, the notification server 6000 provides the one or more asynchronous notifications to the one or more human participants.

According to certain embodiments, if the one or more valid messages are addressed to at least one bot (e.g., an AI assistant), certain client input data are prepared and retrieved from the data storage unit 3000 and then sent to the large language model server 4000. In some embodiments, the large language model server 4000 is not a part of the system 100. For example, the one or more valid messages that are addressed to at least one bot (e.g., an AI assistant) are one or more bot query messages 2500. As an example, the large language model server 4000 also receives the one or more bot query messages 2500. For example, the certain client input data that are retrieved from the data storage unit 3000 and received by the large language model server 4000 include client transcript data (e.g., one or more client transcriptions), information about one or more speakers, and/or one or more chat conversation histories. In some examples, after the large language model server 4000 receives the certain client input data, the large language model server 4000 generates one or more responses 4500 from the AI assistant (e.g., one or more AI powered bot responses). In certain examples, the large language model server 4000 includes at least a part of the functionality of the AI assistant. For example, the one or more responses are generated based at least in part upon the context of the one or more conversations (e.g., the meeting content), the one or more user inputs (e.g., the one or more user questions), and/or one or more previous interactions. As an example, the one or more conversations (e.g., the meeting content) include an ongoing meeting in which the one or more chat clients (e.g., one or more users) are participating. In certain examples, the one or more responses from the AI assistant include one or more answers to the one or more user questions. In some examples, the one or more responses are presented in one or more different formats. For example, the one or more responses are one or more text responses. As an example, the one or more responses are one or more audio responses.

In certain examples, the large language model server 4000 sends the one or more responses 4500 (e.g., one or more AI powered bot responses) to the message queue unit 5000. For example, the message queue unit 5000 provides one or more chat message updates in real time to all of the one or more chat clients (e.g., one or more users) using the same chat interface (e.g., the same chat window). As an example, the message queue unit 5000 publishes, in real time, the one or more responses from the AI assistant through the chat interface (e.g., in the chat window). For example, the message queue unit 5000 publishes, in real time, the one or more valid messages by using at least WebSocket. In some examples, the large language model server 4000 also communicates with the notification server 6000 in order to provide one or more asynchronous notifications (e.g., one or more asynchronous alerts) about the one or more responses from the AI assistant via email and/or one or more other asynchronous alert systems.

According to some embodiments, if the one or more valid messages are addressed to at least one bot (e.g., an AI assistant) and also to one or more humans (e.g., one or more human participants), the one or more valid messages are processed as one or more messages that are addressed to at least one bot (e.g., an AI assistant) and also as one or more messages that are addressed to one or more humans (e.g., one or more human participants).

In some embodiments, the data storage 3000 (e.g., a data repository) can include audio data, visual data, transcripts, summaries, screen captures (e.g., snapshots, images, captured images, captured videos, etc.), messages, responses, extracted content, events, annotations, account information, and/or the like. The data storage 3000 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the system 100 can execute software or firmware stored in non-transitory computer-readable medium to implement various processing steps. Various components and processors of the system 100 can be implemented by one or more computing devices including, but not limited to, circuits, a computer, a cloud-based processing unit, a processor, a processing unit, a microprocessor, a mobile computing device, and/or a tablet computer. In some cases, various components of the system 100 can be implemented on a shared computing device. Alternatively, a component of the system 100 can be implemented on multiple computing devices. In some implementations, various modules and components of the system 100 can be implemented as software, hardware, firmware, or a combination thereof. In some cases, various components of the system 100 can be implemented in software or firmware executed by a computing device.

Various components of the system 100 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

FIG. 3 is a simplified diagram showing a method 200 for providing a chat interface to one or more conversations according to certain embodiments of the present disclosure. This diagram is merely an example, which should not unduly limit the scope of the claims. One of ordinary skill in the art would recognize many variations, alternatives, and modifications. The method 200 for providing a chat interface to one or more conversations is implemented by the system 100 as shown in FIG. 2 as described above according to some embodiments. Although the above has been shown using a selected group of processes for the method for providing a chat interface to one or more conversations, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present disclosure.

According to certain embodiments, the system (e.g., the system for providing a chat interface) is configured to receive and/or present one or more messages 210 via a chat interface (e.g., a visual interface, an audio interface). In some embodiments, the system sends the one or more messages via a software interface 215 (e.g., an application programming interface (API), a software service, etc.). In certain embodiments, the system determines one or more types of the one or more messages 220. If a message is to be handled by an AI assistant (e.g., a bot query message, etc.), in some examples, the message is handled by the AI assistant 230 to prepare one or more inputs associated with the message. For example, the AI assistant parse the message to generate one or more inputs (e.g., an input for a data field).

According to some embodiments, the system includes a transcript and/or content generation process 280. In certain embodiments, the process 280 includes accessing and/or managing user profiles, user calendars and/or media audio streams 285. In some embodiments, the process 280 includes accessing media content, also referred to meeting artifacts (e.g., one or more presented slides, one or more media, one or more attached documents, one or more videos, and/or one or more other meeting materials), from the streaming server. In some embodiments, the process 280 includes a transcribing process 295 to generate transcripts (e.g., one or more transcript sessions). In certain embodiments, the system stores messages (e.g., stash message record, etc.) 225 into the data storage 240.

In certain embodiments, the system prepares one or more prompts 235 using one or more transcripts, speaker information, message history, one or more inputs associated with the message, and/or the like. In some embodiments, the system provides the one or more prompts to a large language model server 245 (e.g., a software service including a large language model running on a computing device, etc.). In certain embodiments, the system receives a response 250 (e.g., AI powered bot response, a message response, etc.) from the large language model server.

In some embodiments, the system adds the response to a message queue 255. In certain embodiments, if a message is addressed to a human, the system sends the message 265 to the message queue 255. In certain embodiments, the system transmits the messages in the message queue via a Websocket 275 in real-time (e.g., no more than 1 second) to present the message by the chat client. In some embodiments, the system publishes 260 the messages in the message queue 255, which includes the response (e.g., AI powered bot response). In certain embodiments, if the publishing process 260 is successful, the system sends a communication to a notification server 270. In some embodiments, the notification server sends one or more emails and/or asynchronous notification alerts, for example, asynchronously. In some embodiments, the notification server sends one or more emails and/or asynchronous notification alerts, for example, informing the chat client (e.g., a client application providing a chat interface that runs on a computing device) that the response is available.

Figure 4:
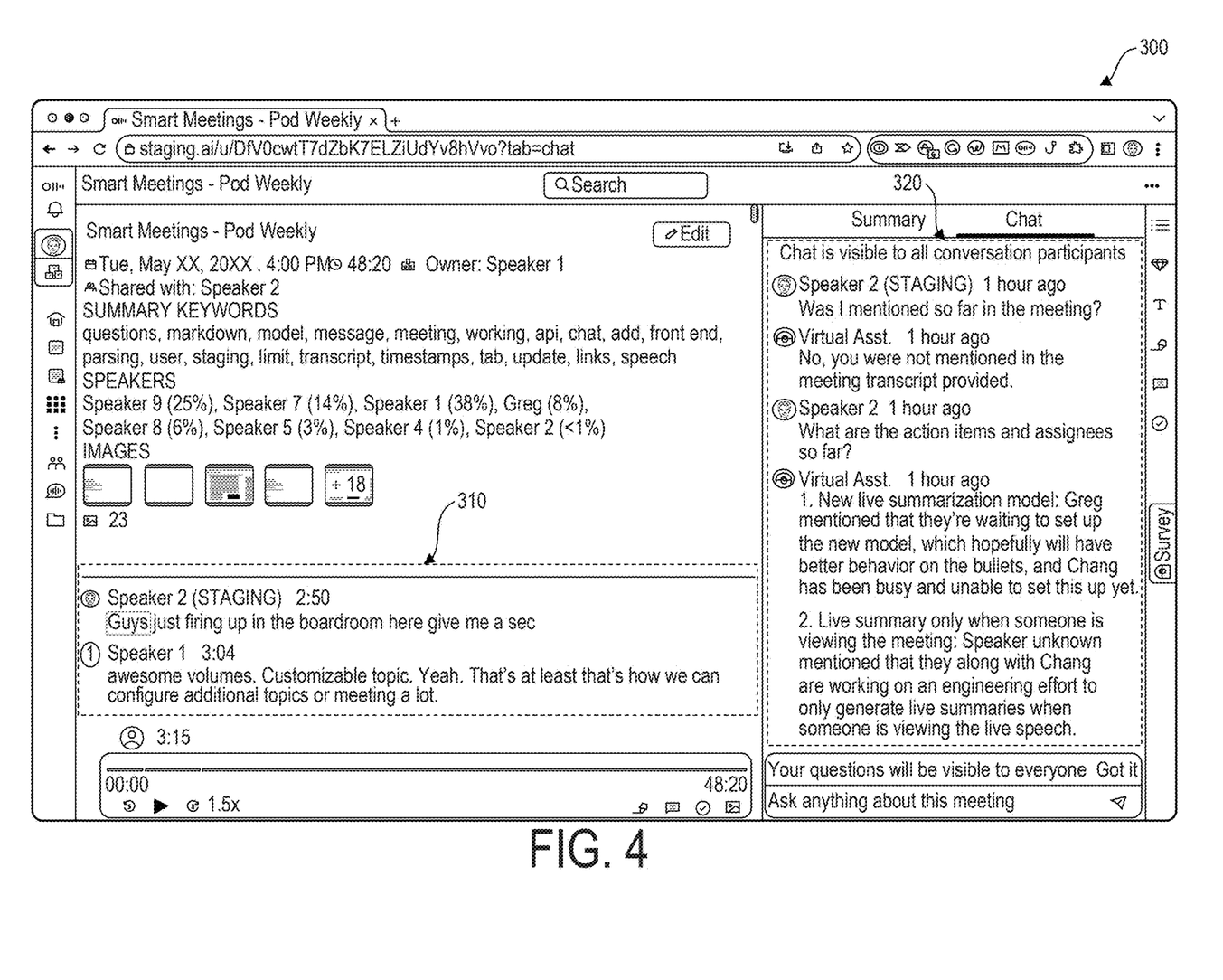
FIG. 4 is a simplified diagram showing a screenshot for providing a chat interface to one or more conversations according to certain embodiments of the present disclosure.

FIG. 4 is a simplified diagram showing a screenshot for providing a chat interface to one or more conversations that have been generated by the system 100 as shown in FIG. 2 using the method 200 as shown in FIG. 3 according to certain embodiments of the present disclosure. This diagram is merely an example, which should not unduly limit the scope of the claims. One of ordinary skill in the art would recognize many variations, alternatives, and modifications. The screenshot 300 shows a transcript 310 of an ongoing meeting and a chat interface 320 that shows interactions between one or more human meeting participants and the AI assistant (e.g., Otter).

As discussed above and further emphasized here, FIG. 2, FIG. 3, and FIG. 4 are merely examples, which should not unduly limit the scope of the claims. One of ordinary skill in the art would recognize many variations, alternatives, and modifications. In some embodiments, the one or more chat clients (e.g., one or more users) are one or more participants of a meeting, and the one or more chat clients (e.g., one or more users) orally present one or more messages (e.g., one or more chat client messages) during the meeting. For example, the one or more messages become part of the real-time transcript for the ongoing meeting. As an example, in response to the one or more messages, the system 100 orally presents one or more responses from the AI assistant (e.g., one or more AI powered bot responses) during the meeting. For example, the one or more responses from the AI assistant also become part of the real-time transcript of the ongoing meeting.

According to certain embodiments, a computer-implemented method for providing a chat interface, the method comprising: receiving a message associated with a meeting from the chat interface; receiving meeting content associated with the meeting; determining one or more meeting contexts in the meeting content based at least in part on the message; generating a message response using a computational model based at least in part on the one or more meeting contexts and the message; and presenting the message response on the chat interface. For example, the method is implemented according to at least FIG. 1, FIG. 2, FIG. 3, and/or FIG. 4.

In some embodiments, the chat interface includes an audio interface, and the message is a voice message received from the audio interface. In certain embodiments, the chat interface includes an audio interface, wherein the presenting the message response on the chat interface includes outputting the message response as a voice response via the audio interface. In some embodiments, the presenting the message response on the chat interface includes outputting the message response as a voice response via the audio interface by a virtual assistant.

In certain embodiments, the outputting the message response as a voice response via the audio interface by a virtual assistant includes: identifying a moment during the meeting while the meeting is occurring; and outputting the voice response via the audio interface at the moment. In some embodiments, the generating a message response includes generating the message response by a virtual assistant within a threshold time duration from receiving the message. In certain embodiments, the presenting the message response on the chat interface includes an indication that the message response is output by the virtual assistant. In some embodiments, the message is a first message, where the method further comprises: receiving a second message via the chat interface; receiving a second response from a human user participating the meeting; and presenting the second response via the chat interface.

In some embodiments, the message response includes a text response, wherein the chat interface includes a meeting content section and a chat section visually, wherein the presenting the message response on the chat interface includes presenting the text response in the chat section. In certain embodiments, the generating a message response using a computational model based at least in part on the one or more meeting contexts and the message includes generating, by a virtual assistant, the message response based at least in part on the one or more meeting contexts and the message while the meeting occurs; wherein the presenting the message response on the chat interface includes presenting, by the virtual assistant, the message response on the chat interface while the meeting occurs. In some embodiments, the message is received by a subset of meeting participants specified by a user, wherein the presenting the message response includes presenting, by the virtual assistant, the message response to the subset of meeting participants and the user. In certain embodiments, the subset of meeting participants include the user and the virtual assistant only.

In certain embodiments, the meeting includes a plurality of meetings, wherein the generating a message response using a computational model based at least in part on the one or more meeting contexts and the message includes generating, by a virtual assistant, the message response based at least in part on the one or more meeting contexts, meeting content of the plurality of meetings, and the message, wherein the virtual assistant is configured to access the meeting content of the plurality of meetings. In some embodiments, the method further comprises: receiving an input indicating a user criteria; wherein the generating a message response using a computational model based at least in part on the one or more meeting contexts and the message includes generating the message response based at least in part on the one or more meeting contexts, the user criteria, and the message. In some embodiments, the method further comprises: generating, by a virtual assistant, one or more insights associated with the meeting without receiving any message.

In some embodiments, the method further comprises: determining, by a virtual assistant, one or more action items associated with the meeting; and performing, by the virtual assistant, one or more actions associated with the one or more action items. In some embodiments, the method further comprises: receiving a meeting artifact associated with the meeting; wherein the generating a message response using a computational model based at least in part on the one or more meeting contexts and the message includes generating the message response based at least in part on the one or more meeting contexts, the meeting artifact, and the message. In some embodiments, the method further comprises: receiving a specific format associated with the user and the meeting; and revising the message response based on the specific format.

In certain embodiments, the generating a message response using a computational model based at least in part on the one or more meeting contexts and the message includes: generating a prompt based at least in part on the message and the one or more meeting contexts; transmitting the prompt to a computing device hosting the computational model; receiving, from the computing device, the message response generated based at least in part on the prompt. In some embodiments, the one or more meeting contexts include at least one selected from a group consisting of one or more audio segments, one or more transcript segments, one or more media artifacts, meeting information, speaker information, and participant information. In certain embodiments, the computational model includes a large language model.

According to some embodiments, a computing system for providing a chat interface, the computing system comprising: one or more memories including instructions stored thereon; and one or more processors configured to execute the instructions and perform operations comprising: receiving a message associated with a meeting from the chat interface; receiving meeting content associated with the meeting; determining one or more meeting contexts in the meeting content based at least in part on the message; generating a message response using a computational model based at least in part on the one or more meeting contexts and the message; and presenting the message response on the chat interface. For example, the system is implemented according to at least FIG. 1, FIG. 2, FIG. 3, and/or FIG. 4.

In some embodiments, the chat interface includes an audio interface, and the message is a voice message received from the audio interface. In certain embodiments, the chat interface includes an audio interface, wherein the presenting the message response on the chat interface includes outputting the message response as a voice response via the audio interface. In some embodiments, the presenting the message response on the chat interface includes outputting the message response as a voice response via the audio interface by a virtual assistant.

In certain embodiments, the outputting the message response as a voice response via the audio interface by a virtual assistant includes: identifying a moment during the meeting while the meeting is occurring; and outputting the voice response via the audio interface at the moment. In some embodiments, the generating a message response includes generating the message response by a virtual assistant within a threshold time duration from receiving the message. In certain embodiments, the presenting the message response on the chat interface includes an indication that the message response is output by the virtual assistant. In some embodiments, the message is a first message, where the operations further comprise: receiving a second message via the chat interface; receiving a second response from a human user participating the meeting; and presenting the second response via the chat interface.

In some embodiments, the message response includes a text response, wherein the chat interface includes a meeting content section and a chat section visually, wherein the presenting the message response on the chat interface includes presenting the text response in the chat section. In certain embodiments, the generating a message response using a computational model based at least in part on the one or more meeting contexts and the message includes generating, by a virtual assistant, the message response based at least in part on the one or more meeting contexts and the message while the meeting occurs; wherein the presenting the message response on the chat interface includes presenting, by the virtual assistant, the message response on the chat interface while the meeting occurs. In some embodiments, the message is received by a subset of meeting participants specified by a user, wherein the presenting the message response includes presenting, by the virtual assistant, the message response to the subset of meeting participants and the user. In certain embodiments, the subset of meeting participants include the user and the virtual assistant only.

In certain embodiments, the meeting includes a plurality of meetings, wherein the generating a message response using a computational model based at least in part on the one or more meeting contexts and the message includes generating, by a virtual assistant, the message response based at least in part on the one or more meeting contexts, meeting content of the plurality of meetings, and the message, wherein the virtual assistant is configured to access the meeting content of the plurality of meetings. In some embodiments, the operations further comprise: receiving an input indicating a user criteria; wherein the generating a message response using a computational model based at least in part on the one or more meeting contexts and the message includes generating the message response based at least in part on the one or more meeting contexts, the user criteria, and the message. In some embodiments, the operations further comprise: generating, by a virtual assistant, one or more insights associated with the meeting without receiving any message.

In some embodiments, the operations further comprise: determining, by a virtual assistant, one or more action items associated with the meeting; and performing, by the virtual assistant, one or more actions associated with the one or more action items. In some embodiments, the operations further comprise: receiving a meeting artifact associated with the meeting; wherein the generating a message response using a computational model based at least in part on the one or more meeting contexts and the message includes generating the message response based at least in part on the one or more meeting contexts, the meeting artifact, and the message. In some embodiments, the operations further comprise: receiving a specific format associated with the user and the meeting; and revising the message response based on the specific format.

In certain embodiments, the generating a message response using a computational model based at least in part on the one or more meeting contexts and the message includes: generating a prompt based at least in part on the message and the one or more meeting contexts; transmitting the prompt to a computing device hosting the computational model; receiving, from the computing device, the message response generated based at least in part on the prompt. In some embodiments, the one or more meeting contexts include at least one selected from a group consisting of one or more audio segments, one or more transcript segments, one or more media artifacts, meeting information, speaker information, and participant information. In certain embodiments, the computational model includes a large language model.

According to certain embodiments, a non-transitory computer-readable medium storing instructions for providing a chat interface, the instructions upon execution by one or more processors of a computing system, cause the computing system to perform one or more operations comprising: receiving a message associated with a meeting from the chat interface; receiving meeting content associated with the meeting; determining one or more meeting contexts in the meeting content based at least in part on the message; generating a message response using a computational model based at least in part on the one or more meeting contexts and the message; and presenting the message response on the chat interface. For example, the non-transitory computer-readable medium is implemented according to at least FIG. 1, FIG. 2, FIG. 3, and/or FIG. 4.

In some embodiments, the chat interface includes an audio interface, and the message is a voice message received from the audio interface. In certain embodiments, the chat interface includes an audio interface, wherein the presenting the message response on the chat interface includes outputting the message response as a voice response via the audio interface. In some embodiments, the presenting the message response on the chat interface includes outputting the message response as a voice response via the audio interface by a virtual assistant.

In certain embodiments, the outputting the message response as a voice response via the audio interface by a virtual assistant includes: identifying a moment during the meeting while the meeting is occurring; and outputting the voice response via the audio interface at the moment. In some embodiments, the generating a message response includes generating the message response by a virtual assistant within a threshold time duration from receiving the message. In certain embodiments, the presenting the message response on the chat interface includes an indication that the message response is output by the virtual assistant. In some embodiments, the message is a first message, where the operations further comprise: receiving a second message via the chat interface; receiving a second response from a human user participating the meeting; and presenting the second response via the chat interface.

In some embodiments, the message response includes a text response, wherein the chat interface includes a meeting content section and a chat section visually, wherein the presenting the message response on the chat interface includes presenting the text response in the chat section. In certain embodiments, the generating a message response using a computational model based at least in part on the one or more meeting contexts and the message includes generating, by a virtual assistant, the message response based at least in part on the one or more meeting contexts and the message while the meeting occurs; wherein the presenting the message response on the chat interface includes presenting, by the virtual assistant, the message response on the chat interface while the meeting occurs. In some embodiments, the message is received by a subset of meeting participants specified by a user, wherein the presenting the message response includes presenting, by the virtual assistant, the message response to the subset of meeting participants and the user. In certain embodiments, the subset of meeting participants include the user and the virtual assistant only.

In certain embodiments, the meeting includes a plurality of meetings, wherein the generating a message response using a computational model based at least in part on the one or more meeting contexts and the message includes generating, by a virtual assistant, the message response based at least in part on the one or more meeting contexts, meeting content of the plurality of meetings, and the message, wherein the virtual assistant is configured to access the meeting content of the plurality of meetings. In some embodiments, the operations further comprise: receiving an input indicating a user criteria; wherein the generating a message response using a computational model based at least in part on the one or more meeting contexts and the message includes generating the message response based at least in part on the one or more meeting contexts, the user criteria, and the message. In some embodiments, the operations further comprise: generating, by a virtual assistant, one or more insights associated with the meeting without receiving any message.

In some embodiments, the operations further comprise: determining, by a virtual assistant, one or more action items associated with the meeting; and performing, by the virtual assistant, one or more actions associated with the one or more action items. In some embodiments, the operations further comprise: receiving a meeting artifact associated with the meeting; wherein the generating a message response using a computational model based at least in part on the one or more meeting contexts and the message includes generating the message response based at least in part on the one or more meeting contexts, the meeting artifact, and the message. In some embodiments, the operations further comprise: receiving a specific format associated with the user and the meeting; and revising the message response based on the specific format.

In certain embodiments, the generating a message response using a computational model based at least in part on the one or more meeting contexts and the message includes: generating a prompt based at least in part on the message and the one or more meeting contexts; transmitting the prompt to a computing device hosting the computational model; receiving, from the computing device, the message response generated based at least in part on the prompt. In some embodiments, the one or more meeting contexts include at least one selected from a group consisting of one or more audio segments, one or more transcript segments, one or more media artifacts, meeting information, speaker information, and participant information. In certain embodiments, the computational model includes a large language model.

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., SSD, RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for providing a chat interface, the method comprising:
    receiving a message associated with a meeting from the chat interface;
    receiving meeting content associated with the meeting;
    determining one or more meeting contexts in the meeting content based at least in part on the message;
    generating a message response using a computational model based at least in part on the one or more meeting contexts and the message; and
    presenting the message response on the chat interface, wherein the presenting the message response on the chat interface includes outputting the message response as a voice response via an audio interface by a virtual assistant;
    wherein the outputting the message response as a voice response via an audio interface by a virtual assistant includes:
        identifying a speaker changing moment during the meeting while the meeting is occurring; and
        at the identified speaker changing moment, outputting the voice response via the audio interface.

2. The computer-implemented method of claim 1, wherein the chat interface includes the audio interface, wherein the message is a voice message received from the audio interface.

3. The computer-implemented method of claim 1, wherein the generating a message response includes generating the message response by the virtual assistant within a threshold time duration from receiving the message.

4. The computer-implemented method of claim 3, wherein the message is a first message, wherein the method further comprises:
    receiving a second message via the chat interface;
    receiving a second response from a human user participating in the meeting; and
    presenting the second response via the chat interface.

5. The computer-implemented method of claim 1, wherein the message response includes a text response, wherein the chat interface includes a meeting content section and a chat section visually, wherein the presenting the message response on the chat interface includes presenting the text response in the chat section.

6. The computer-implemented method of claim 1, wherein the generating a message response using a computational model based at least in part on the one or more meeting contexts and the message includes generating, by the virtual assistant, the message response based at least in part on the one or more meeting contexts and the message while the meeting occurs; and
    the presenting the message response on the chat interface includes outputting the message response as the voice response via the audio interface by the virtual assistant while the meeting occurs.

7. The computer-implemented method of claim 6, wherein: the message is received by a subset of meeting participants specified by a user; and the presenting the message response includes presenting, by the virtual assistant, the message response to the subset of meeting participants and the user.

8. The computer-implemented method of claim 1, further comprising:
    receiving an input indicating one or more user criteria;
    wherein the generating a message response using a computational model based at least in part on the one or more meeting contexts and the message includes generating the message response based at least in part on the one or more meeting contexts, the one or more user criteria, and the message.

9. The computer-implemented method of claim 1, further comprising:
    generating, by the virtual assistant, one or more insights associated with the meeting without receiving any message.

10. The computer-implemented method of claim 1, further comprising:
    determining, by the virtual assistant, one or more action items associated with the meeting; and
    performing, by the virtual assistant, one or more actions associated with the one or more action items.

11. The computer-implemented method of claim 1, further comprising:
    receiving a meeting artifact associated with the meeting;
    wherein the generating a message response using a computational model based at least in part on the one or more meeting contexts and the message includes generating the message response based at least in part on the one or more meeting contexts, the meeting artifact, and the message.

12. The computer-implemented method of claim 1, further comprising:
    receiving a specific format associated with the meeting; and
    revising the message response based on the specific format.

13. The computer-implemented method of claim 1, wherein the generating a message response using a computational model based at least in part on the one or more meeting contexts and the message includes:
    generating a prompt based at least in part on the message and the one or more meeting contexts;
    transmitting the prompt to a computing device hosting the computational model;
    receiving, from the computing device, the message response generated based at least in part on the prompt.

14. The computer-implemented method of claim 1, wherein the one or more meeting contexts include at least one selected from a group consisting of one or more audio segments, one or more transcript segments, one or more media artifacts, meeting information, speaker information, and participant information.

15. The computer-implemented method of claim 1, wherein the computational model includes a large language model.

16. A computing system for providing a chat interface, the computing system comprising:
one or more memories including instructions stored thereon; and
one or more processors configured to execute the instructions and perform operations comprising:
receiving a message associated with a meeting from the chat interface;
receiving meeting content associated with the meeting;
determining one or more meeting contexts in the meeting content based at least in part on the message;
generating a message response using a computational model based at least in part on the one or more meeting contexts and the message; and
presenting the message response on the chat interface, wherein the presenting the message response on the chat interface includes outputting the message response as a voice response via an audio interface by a virtual assistant;
wherein the outputting the message response as a voice response via an audio interface by a virtual assistant includes:
identifying a speaker changing moment during the meeting while the meeting is occurring; and
at the identified speaker changing moment, outputting the voice response via the audio interface.

17. The computing system of claim 16, wherein the chat interface includes the audio interface, wherein the message is a voice message received from the audio interface.

18. The computing system of claim 16, wherein the generating a message response includes generating the message response by the virtual assistant within a threshold time duration from receiving the message.

19. The computing system of claim 18, wherein the message is a first message, wherein the operations further comprise:
receiving a second message via the chat interface;
receiving a second response from a human user participating in the meeting; and
presenting the second response via the chat interface.

20. A non-transitory computer-readable medium storing instructions for providing a chat interface, the instructions upon execution by one or more processors of a computing system, cause the computing system to perform one or more operations comprising:
receiving a message associated with a meeting from the chat interface;
receiving meeting content associated with the meeting;
determining one or more meeting contexts in the meeting content based at least in part on the message;
generating a message response using a computational model based at least in part on the one or more meeting contexts and the message; and
presenting the message response on the chat interface, wherein the presenting the message response on the chat interface includes outputting the message response as a voice response via an audio interface by a virtual assistant;
wherein the outputting the message response as a voice response via an audio interface by a virtual assistant includes:
identifying a speaker changing moment during the meeting while the meeting is occurring; and
at the identified speaker changing moment, outputting the voice response via the audio interface.

\* \* \* \* \*